United States Patent
Ren et al.

(10) Patent No.: US 9,917,463 B2
(45) Date of Patent: Mar. 13, 2018

(54) SYSTEM AND METHOD FOR DISCHARGING A THYRISTOR-SWITCHED CAPACITOR

(71) Applicant: General Electric Company, Schenectady, NY (US)

(72) Inventors: Wei Ren, Schenectady, NY (US); Einar Larsen, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 139 days.

(21) Appl. No.: 14/866,620

(22) Filed: Sep. 25, 2015

(65) Prior Publication Data

US 2017/0093177 A1   Mar. 30, 2017

(51) Int. Cl.
| | |
|---|---|
| H02J 7/00 | (2006.01) |
| G05F 3/00 | (2006.01) |
| H02H 1/00 | (2006.01) |
| H02J 3/16 | (2006.01) |
| H02J 3/18 | (2006.01) |

(52) U.S. Cl.
CPC ............. *H02J 7/007* (2013.01); *H02J 3/16* (2013.01); *H02J 3/1821* (2013.01); *H02J 7/0063* (2013.01); *Y02E 40/12* (2013.01); *Y02E 40/34* (2013.01)

(58) Field of Classification Search
CPC ......... H02J 7/007; H02J 7/0063; Y02E 40/30; H01T 1/14
USPC .......................... 320/166; 323/209; 361/124
See application file for complete search history.

(56) References Cited

U.S. PATENT DOCUMENTS

| | | | |
|---|---|---|---|
| 4,475,139 A | 10/1984 | Chadwick | |
| 4,567,424 A | 1/1986 | Dobsa et al. | |
| 4,571,535 A | 2/1986 | Gyugyi | |
| 4,636,910 A | 1/1987 | Chadwick | |
| 4,644,457 A * | 2/1987 | Masuda | H03K 3/57 363/37 |
| 5,355,076 A * | 10/1994 | Chadwick | H02J 3/1807 307/105 |
| 5,402,058 A | 3/1995 | Larsen | |
| 5,434,497 A | 7/1995 | Larsen | |
| 6,459,559 B1 * | 10/2002 | Christofersen | H02H 9/04 361/124 |

(Continued)

OTHER PUBLICATIONS

European Search Report issued in connection with corresponding EP Application No. 16190279.6 dated Feb. 21, 2017.

*Primary Examiner* — M'Baye Diao
(74) *Attorney, Agent, or Firm* — Parks IP Law LLC

(57) ABSTRACT

There are provided methods, devices, and systems relating to discharging thyristor-switched capacitors. For example, there is provided a method for discharging the capacitors of a thyristor-switched capacitor (TSC) device coupled to a transmission line. The method can include determining whether an angle of a voltage on the transmission line is within one of a first threshold range and a second threshold range. Further, the method can include discharging the capacitors, when the angle is within the first threshold range, by operating the TSC device in a first discharging mode. Furthermore, the method can include discharging the capacitors, when the angle is within the second threshold range, by operating the TSC device in a second discharging mode distinct from the first discharging mode.

19 Claims, 10 Drawing Sheets

(56) References Cited

U.S. PATENT DOCUMENTS 6,785,109 B1\* 8/2004 Huang ................ H01L 27/0251
361/111
8,965,747 B2\* 2/2015 Zhang ....................... H02J 3/26
703/13

\* cited by examiner

100

200

300

400

500

600

601

603

700

900

1000

SYSTEM AND METHOD FOR DISCHARGING A THYRISTOR-SWITCHED CAPACITOR

TECHNICAL FIELD

The present disclosure generally relates to a system and a method of discharging a capacitor. More particularly, the present disclosure relates to systems and methods for discharging a thyristor-switched capacitor.

BACKGROUND

A thyristor-switched capacitor (TSC) is a reactive power compensation device that is often used in power systems. In a power system that uses a TSC, a branch of capacitor banks can be connected or disconnected to a power grid simply by switching a thyristor associated with the branch, thus providing reactive power injection capabilities.

Two topologies that are often used are the "Delta" type TSC and the "Wye" type TSC. For both topologies, each phase of a transmission system is coupled to a capacitor that provides reactive power compensation. In series with that capacitor, there are two thyristors connected in parallel but in opposite directions, and a surge inductor. The anti-parallel thyristors allow current to flow in either direction, and the surge inductor is used to limit large transient currents through the branch.

When a TSC is turned off, a certain amount of electric charge will be trapped on the capacitor because the AC voltage across the capacitor and the AC current flowing through it are not in phase, i.e. they do not cross zero at the same time. As such, when the TSC is turned off, a constant voltage is left on the capacitor. In a given system, the peak value of this trapped voltage can reach or exceed 2 per unit (pu) values of the nominal system voltage, depending on the type of TSC used and the system's operating conditions. Consequently, a thyristor must be rated with a high blocking voltage in order to prevent damage. This increases the per-component cost and may also require additional protection circuitry, which in turns increases the complexity and overall cost of a TSC system.

SUMMARY

The embodiments featured herein help solve or mitigate the above-noted issues as well as other issues known in the art. Specifically, the exemplary systems and methods allow the discharging of a thyristor-switched capacitor without using any voltage or current-limiting devices as is done in the related art. The exemplary systems and methods are particularly useful for use with Wye-type TSCs, as currently-available methods for actively discharging Delta-type TSCs are not compatible with Wye-type TSCs.

In one embodiment, there is provided a method for discharging the capacitors of a thyristor-switched capacitor (TSC) device coupled to a transmission line. The method can include determining whether an angle of a voltage on the transmission line is within one of a first threshold range and a second threshold range. Further, the method can include discharging the capacitors, when the angle is within the first threshold range, by operating the TSC device in a first discharging mode. Furthermore, the method can include discharging the capacitors, when the angle is within the second threshold range, by operating the TSC device in a second discharging mode distinct from the first discharging mode.

In another embodiment, there is provided a controller that includes a processor communicatively coupled to a pair of thyristors and to a capacitor. The capacitor and the thyristors are coupled to a transmission line. The controller further includes a memory having instructions stored thereon, which when executed by the processor, cause the processor to perform certain operations. The operations can include determining whether an angle of a voltage on the transmission line is within one of a first threshold range and a second threshold range. And the operations can also include discharging the capacitor when the voltage angle is within the first threshold range by operating the at least one thyristor in a first discharging mode. Furthermore, the operations can include discharging the capacitor when the angle is within the second threshold range by operating the at least one thyristor in a second discharging mode distinct from the first discharging mode.

In yet another embodiment, there is provided a system comprising a capacitor, and one pair of anti-parallel thyristor coupled to the capacitor at one end and adapted for coupling to one phase of a transmission line at another end. The system further includes a processor configured to discharge the capacitor according to one of a first discharging mode and a second discharging mode based on an angle of a voltage on the transmission line.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1:
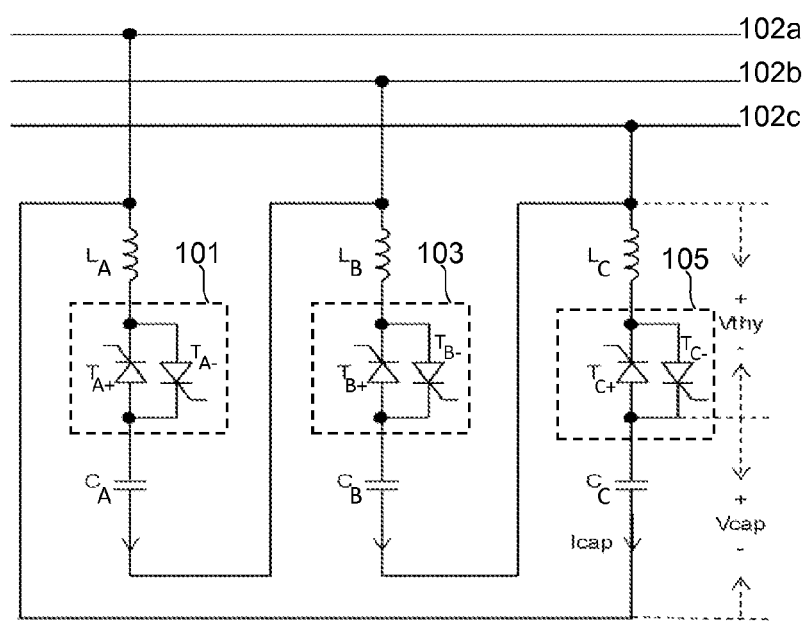
FIG. 1 is an illustration of a Delta-type thyristor-switched capacitor (TSC), according to an embodiment.

FIG. 1 is an illustration of a Delta-type TSC 100 connected to a three-phase transmission line that includes three source buses, each corresponding to a phase of the transmission line. Specifically, the transmission line includes a first phase 102a, a second phase 102b, and a third phase 102c. Each phase is connected to a thyristor-switched capacitor disposed in series with a pair of anti-parallel thyristors and a surge inductor. For example, first phase 102a is connected to surge inductor $L_A$ in series with anti-parallel thyristor pair 101 and capacitor $C_A$. Similarly, second phase 102b is connected to surge inductor $L_B$, thyristor pair 103, and capacitor $C_B$. Further, third phase 102c is connected to surge inductor $L_C$, thyristor pair 105, and capacitor $C_C$. Furthermore, capacitor $C_C$ is connected directly to surge inductor $L_A$, capacitor $C_A$ to surge inductor $L_B$, and capacitor $C_B$ to surge inductor $L_C$. For simplicity, hereinafter, a capacitor, inductor, and their associated thyristor pair may be referred to as a TSC component, while collectively, all three TSC components shown in FIG. 1 may be referred to simply as the TSC.

In FIG. 1, the capacitors provide a means for reactive power injection into specific source buses of the transmission line; this is achieved by switching the appropriate thyristor pair. During operation, the anti-parallel thyristors in each phase are fired alternatively to keep conducting in their respective directions. Firing the anti-parallel thyristors in either direction provides adequate damping to potential switching resonances.

TSC components can receive a turn-off command that is intended to instruct them to stop injecting power into the source buses. In the steady state, turn-off effectively creates an open circuit between each source bus and its respective TSC component, neglecting any leakage currents through the thyristors. Such a command can originate from a co-located or remotely located subsystem or controller, as shall be described in further detailed hereinafter. Similarly, the TSC components can receive a turn-on command, which is intended to have the opposite effect, i.e. to connect the TSC to the source buses for reactive power injection.

Figure 2:
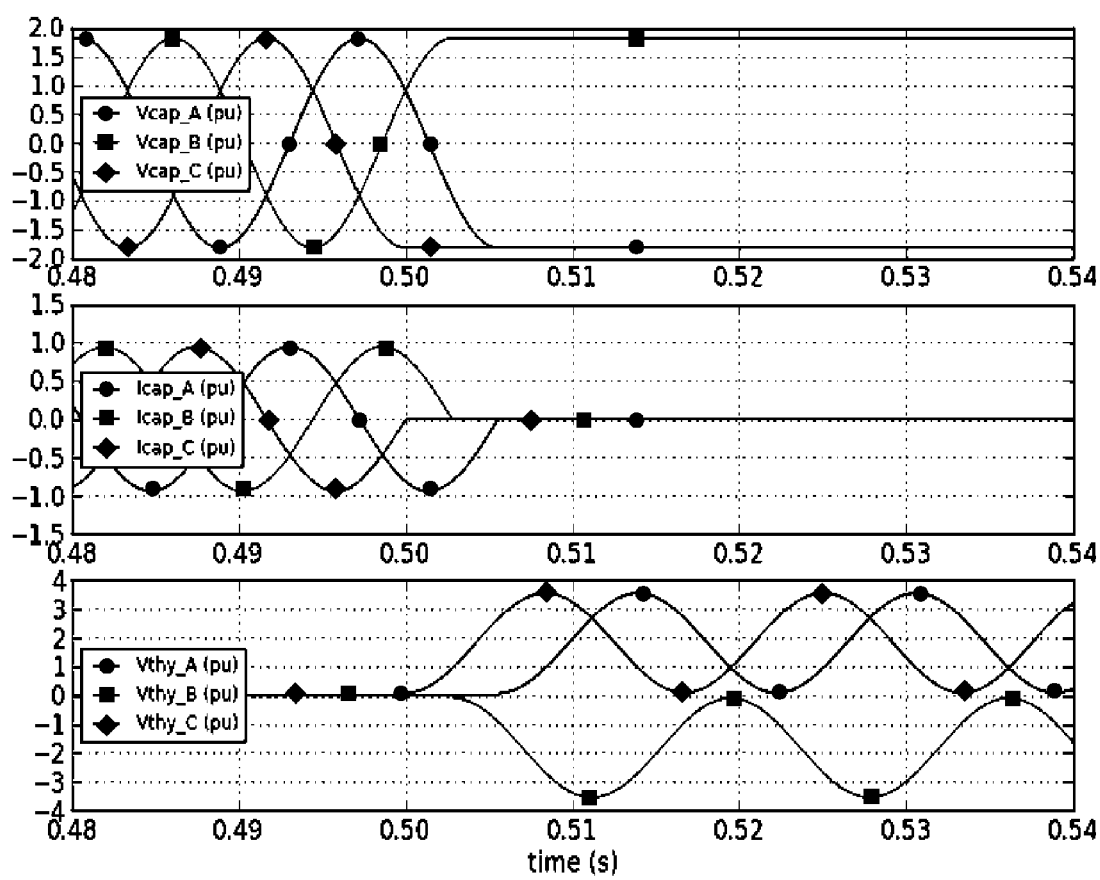
FIG. 2 is a timing diagram characteristic of turning off a Delta-type TSC.

FIG. 2 is a timing diagram 200 consistent with turning off a Delta-type TSC such as the one shown in FIG. 1. Timing diagram 200 includes plots of the voltages across capacitors $C_A$, $C_B$, and $C_C$ (top panel), plots of the currents through the same capacitors (middle panel), and plots of the voltages across the thyristors associated with each of the capacitors (bottom panel). In FIG. 2, values for the x and y axes, as well as amplitude values mentioned hereinafter, are chosen to illustrate the concept of turning off a Delta-type TSC and the issues associated with such an operation. One of skill in the art should readily appreciate that other values are permissible without departing from the scope of the present disclosure.

Turning back to FIG. 2, a turn-off command may be received at a time slightly before or at exactly t=0.5 second (s), for example. Before that time, thyristor pairs 101, 103, and 105 conduct current, and their associated capacitors are effectively connected to their respective source buses. For example, considering third phase 102c, the current through $C_C$, denoted Icap_C, leads the voltage across $C_C$, denoted Vcap_C, by 90 degrees, as expected. Furthermore, due to the small conducting impedance of the thyristors, the thyristor voltage across thyristor pair 105, denoted Vthy_C, is substantially zero.

When the turn-off command is received, firing pulses to the thyristors (not shown) are blocked. Nevertheless, a thyristor will continue to conduct current until its current crosses zero. In the example of FIG. 2, phase 102c is the first phase whose thyristor pair stops conducting. At that moment, the voltage across $C_C$ peaks in its negative direction. This peak value is, without loss of generality, equal to −1.732 pu on the base of the line-to-neutral bus voltage. Similar responses are observed in the other two phases. Namely, Vcap_B peaks in its positive direction and Vcap_A peaks in its negative direction.

In this situation, the thyristors in each pair are turned off, and the terminal voltage across the thyristor pair, Vthy_X, is equal to the line-line source voltage minus voltage trapped on the capacitor, Vcap_X, where X denotes one of A, B, and C, as shown in FIG. 2. This results in a DC-bias in the thyristor voltages after t=0.5 s. As shown in FIG. 2, as a result of receiving the turn-off command, the maximum voltage that the thyristor has to block is about 3.464 pu, i.e. twice the nominal line-line source voltage. This means that the thyristors in each of pair 101, 103, and 105 must be rated to support at least 3.464 pu, which increases cost or circuit complexity if additional current or voltage limiting devices are used for protecting the thyristors.

Figure 3:
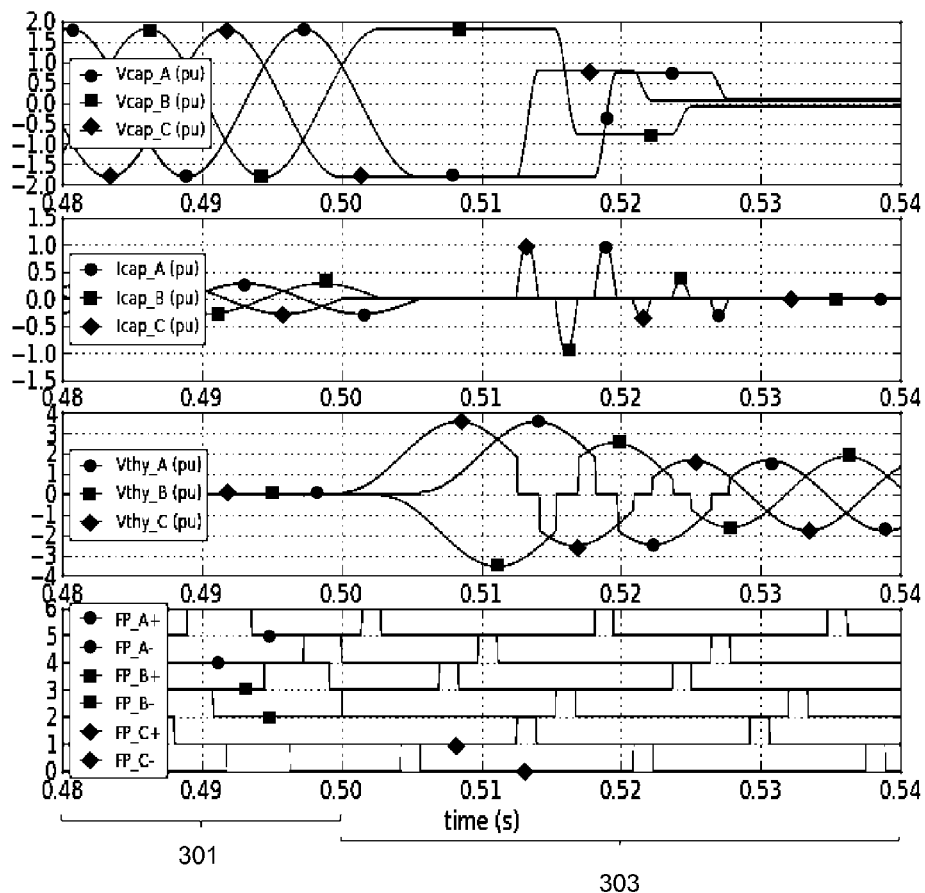
FIG. 3 is a timing diagram characteristic of discharging a Delta-type TSC after a turn-off command is received, according to an embodiment.

FIG. 3 is an illustration of a timing diagram 300 for turning off Delta-type based TSC circuits by actively discharging the capacitors in order to prevent over-exposure to large voltage amplitudes. As in timing diagram 200, timing diagram 300 includes panels showing voltages across the capacitors, current through the capacitors, and voltages across their associated thyristor pairs. Additionally, timing diagram 300 includes a panel showing firing pulses that are used to control the thyristors.

Referring to FIG. 3, FP_A+ and FP_A− denote the firing signals used to operate thyristors TA+ and TA− in thyristor pair 101, respectively. Similarly, FP_B+ and FP_B− correspond to the signals associated with operating thyristors TB+ and TB−, respectively, and FP_C+ and FP_C− correspond to the signals associated with operating thyristors TC+ and TC−, respectively.

Furthermore, as mentioned above, before the turn-off command is received, i.e. during operation, the thyristors in each pair are fired one after the other, i.e. alternatively, in order to minimize switching resonances. This is shown during segment 301 of timing diagram 300, referring to the bottom panel illustrating the firing pulses for each of the thyristor pairs shown in FIG. 1. After the turn-off command is received at or shortly before t=0.5 s, a firing pulse pattern distinct from that of segment 301 is used to control the thyristor pairs so as to actively discharge the capacitors. This new pulse pattern is shown in segment 303.

The new pulse pattern effectively places each of the thyristor pairs in either a conduction mode or a single discharging mode. Selection between each of the modes is based on a value of the angle of the line voltage (i.e. one of first phase 102a, second phase 102b, and third phase 102c) associated with a particular TSC component. The pulse width of the firing pulses may be arbitrary or they may be tuned to obtain a specific ON and/or OFF duration, thereby either increasing or decreasing an average discharging time constant of a capacitor. Table 1 below shows exemplary angle values that can be used to actively discharge all the capacitors shown in FIG. 1, after receiving a turn-off command.

Only one voltage signal on the transmission line is needed to determine an angle for selecting a particular mode. Further, referring to Table 1, it is noted that the measured angle only needs to be substantially equal to the angle values shown. In other words, measured angle values that are within the experimental error of the measurement scheme used can also be used to generate the firing pulses during segment 303.

The voltage (denoted Vab) across the TSC component associated with phase 102a can be used to analyze the above-described method. During the discharging mode, when a thyristor is fired, it may or may not conduct depending on its terminal voltage at the time. If Vab is zero and stays at zero during the conduction of a thyristor, a LC resonance circuit is formed. The charge trapped in capacitor $C_A$ will flow through surge inductor $L_A$. However, because only one direction of the current is allowed, such a resonance will stop at the first half cycle when the capacitor is reversely charged to the same voltage level (neglecting the resistance damping). However, because the source voltage Vab is moving in the opposite direction as the change of the capacitor voltage, the end voltage in the capacitor will have a lower amplitude after each discharge event.

TABLE 1

| | Angle (degrees) of Sinusoidal Voltage for phase 102a | |
|---|---|---|
| Firing Pulse | Conduction Mode | Discharging Mode |
| FP_A+ | 240 | 150 |
| FP_A− | 60 | 330 |
| FP_B+ | 0 | 270 |
| FP_B− | 180 | 90 |
| FP_C+ | 120 | 30 |
| FP_C− | 300 | 210 |

Eventually, after a sufficient number of firing pulses have been generated in time, the capacitor voltage will go towards zero, and the thyristor pair will only see the line voltage of phase 102a, as opposed to the large voltages mentioned above.

The same analysis extends to the TSC components associated with phases 102b and 102c. Further, it is noted that the discharge mode can be further improved by adding a pre-determined delay angle to the nominal angle values shown in Table 1 for the discharge mode. For example, with a delay angle of 15 degrees, all capacitors can be discharged to a substantially zero-voltage level at the first firing pulse, thereby minimizing the discharge time. In summary, the method of discharging a Delta-type TSC according to timing diagram 300 and Table 1 will be referred to hereinafter as "Delta-Type Discharging Method." When the required firing angles are corrected with a delay angle, explained above, the method will be referred to cognominally as "corrected."

Figure 4:
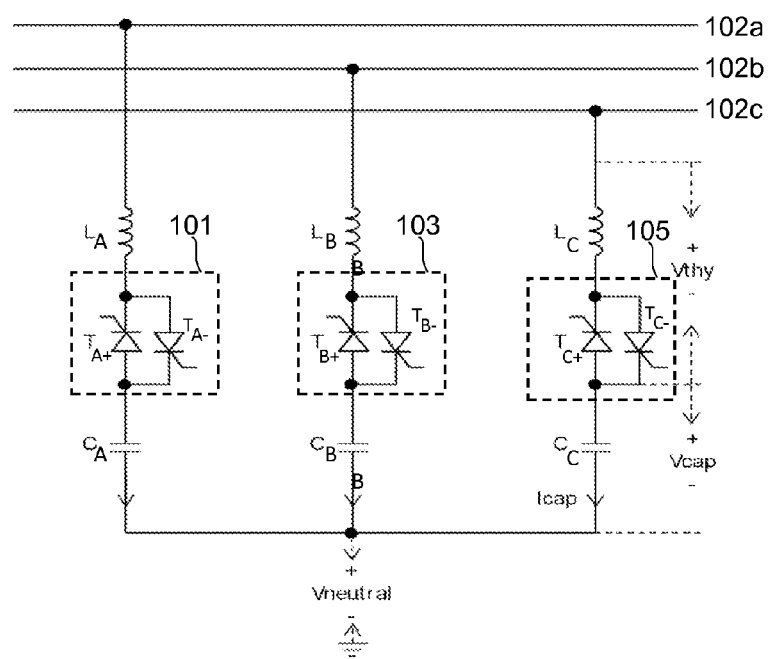
FIG. 4 is an illustration a Wye-type TSC, according to an embodiment.

FIG. 4 illustrates a Wye-type TSC 400. This configuration differs from the one shown in FIG. 1 in that the capacitors are connected to each other at one end to a single node common to a neutral voltage. The three-phases are assumed to be symmetric, hence the neutral-point voltage is zero, i.e. Vneutral is zero.

Figure 5:
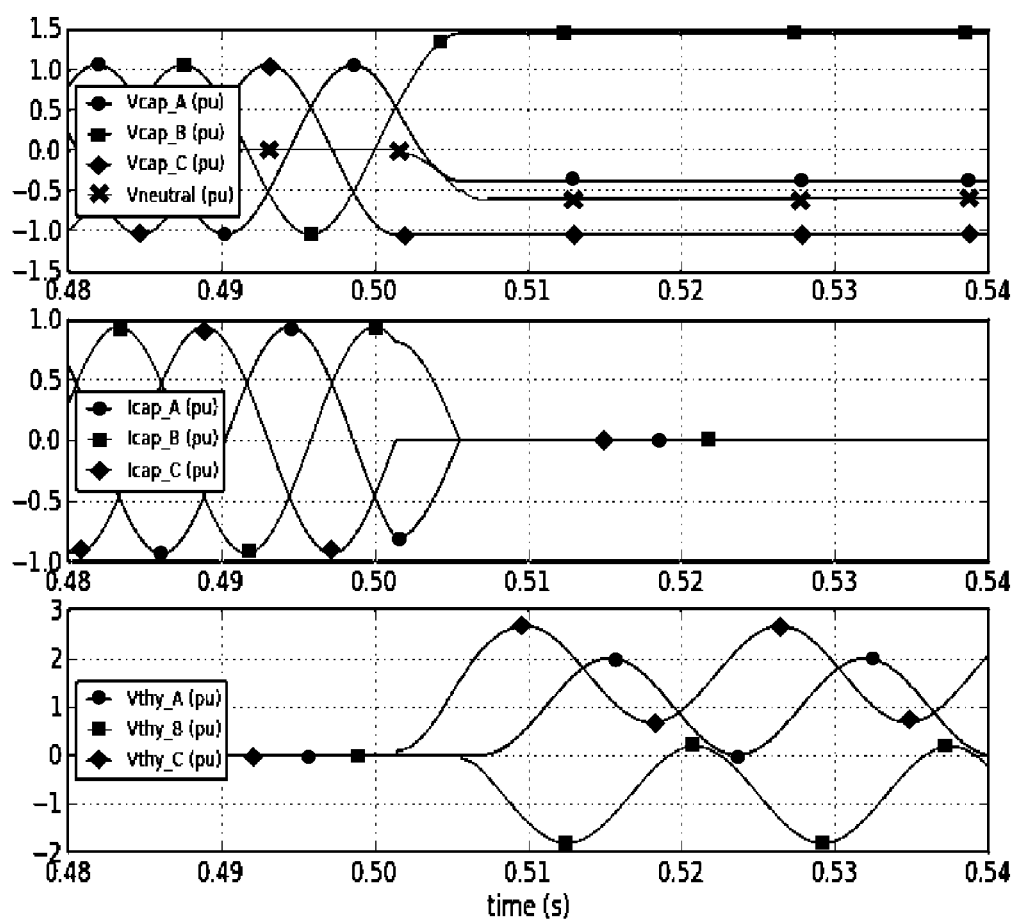
FIG. 5 is a timing diagram characteristic of turning off a Wye-type TSC.

FIG. 5 is a timing diagram 500 consistent with receiving a turn-off command at TSC 400. Again, just like in the case of TSC 100, the capacitor currents lead the capacitor voltages by 90 degrees. Further, timing diagram includes plots of the capacitor voltages (top panel), the capacitor currents (middle panel), and the thyristor terminal voltages (bottom panel).

When the turn-off command is received at or slightly before t=0.5 s, thyristor pair 105 stops conducting first as its currents cross zero. At that moment, capacitor $C_C$ has a trapped voltage of about 1 pu. Within the next 4.16 ms, the other two TSC components are connected in series and the total voltage across them is the line-to-line voltage between phases 102a and 102b. Considering timing diagram 500, detailed calculations can show that when these two phases stop conducting at the same time, the trapped voltage is about 1.39 pu on $C_B$ and −034 pu on $C_A$. The neutral point voltage, Vneutral, is about −0.54 pu when all the three phases are turned off. As such, the maximum voltage that the thyristor has to block in the Wye-type TSC configuration is about 2.5 pu (for phase 102c).

It is noted that while the above mentioned values are merely indicative of the example shown in timing diagram 500. Other values may be obtained based on actual operating conditions. For example, the transmission line voltages may not be equal to 1 pu when the TSC is connected or disconnected, the three phases can be asymmetric, and voltage clamping devices may be used to limit peak values. All these conditions can lead to different values. Nevertheless, this does not affect the qualitative behavior of the Wye-type TSC when a turn-off command is received, as described above.

The discharging method of the Delta-type TSC mentioned in FIG. 3 cannot be applied to the Wye-type TSC of FIG. 4. This is because in a Wye-type TSC, a current flow path now requires at least two thyristors associated with different phases to conduct together. According to an embodiment, this difficulty can be circumvented by using a conditional check to first verify whether a TSC component is in a conduction or a discharging mode. The first check can be based on an angle of the voltage of the phase associated with a particular TSC component.

Furthermore, when the TSC component is determined to be in a discharging mode, i.e. in a turning off mode, an appropriate discharging mode is selected depending on a measured angle. This is done with a second check on the measured angle. In one embodiment, two discharging modes can be used. A first discharging mode (hereafter "mode 1") occurs when, out of the three phases of the transmission line, the first phase that is turned off has a current that stops (goes to zero) after a positive half-cycle, the second discharging mode (hereafter "mode 2") occurs when, out of the three phases of the transmission line, the first phase that is turned off has a current that stops (goes to zero) after a negative half-cycle. Table 2 shows the firing angles values required to perform the first and second checks mentioned above, according to an embodiment.

If the wrong discharging mode is used, the results can be adverse to the thyristor pairs. For example, taking the situation shown in timing diagram 500, if the discharging pulses using angles under mode 1 are used for a case where angles under mode 2 should have been used, the capacitors will still be discharged towards zero, but the blocking voltage across the thyristors can remain high.

TABLE 2

| Firing | Angle (degrees) of Sinusoidal Voltage for phase 102a | | |
|---|---|---|---|
| Pulse | Conduction Mode | Discharging Mode 1 | Discharging Mode 2 |
| FP_A+ | 270 | 150 | 210 |
| FP_A− | 90 | 30 | 330 |
| FP_B+ | 30 | 270 | 330 |
| FP_B− | 210 | 150 | 90 |
| FP_C+ | 150 | 30 | 90 |
| FP_C− | 330 | 270 | 210 |

As such, in order to prevent this issue, in one embodiment, instead of checking whether a measured angle is substantially equal to a nominal angle value, the conditional check can include checking whether the measured angle is within a predetermined angle range, and subsequently selecting one of two discharging modes based on the result of the check.

Mode 1 and mode 2 are each different firing patterns that switch the thyristor pairs on and off. In one embodiment, mode 1 can include firing pulses on at least two thyristors associated with different phases, wherein the firing pulses are synchronized and of the same duration. In the same embodiment, mode 2 can also include firing pulses on at least two thyristors associated with different phases, wherein the firing pulses are synchronized and of the same duration. The modes are distinct in that they are engaged base on different angle values for the line voltage (or as shown below, based on the measured angle of the line voltage being in a specific range).

The conditional check for which one of modes 1 and 2 to use can be conducted in many different ways. In one embodiment, one can measure the capacitor trapped voltages. Alternatively, thyristor currents can be measured directly in order to find out how and when they stop conducting. In another embodiment, the angle of the line voltage at the time the turn-off command is issued can be measured. In another embodiment, the predetermined angle ranges shown in Table 3 can be used to select the appropriate discharge mode.

TABLE 3

| Angle (degrees) at Turn-off Pulse | Discharge Mode |
|---|---|
| >30 and <90 | 1 |
| >90 and <150 | 2 |
| >150 and <210 | 1 |
| >210 and <270 | 2 |
| >270 and <330 | 1 |
| >330 or <30 | 2 |

In another embodiment, the discharging performance can be altered by using a predetermined delay angle (which is simply added to the bounds of the ranges shown in Table 3). For example, using a 15 degree delay angle will cause a faster discharge of the capacitor voltages.

Figure 6:
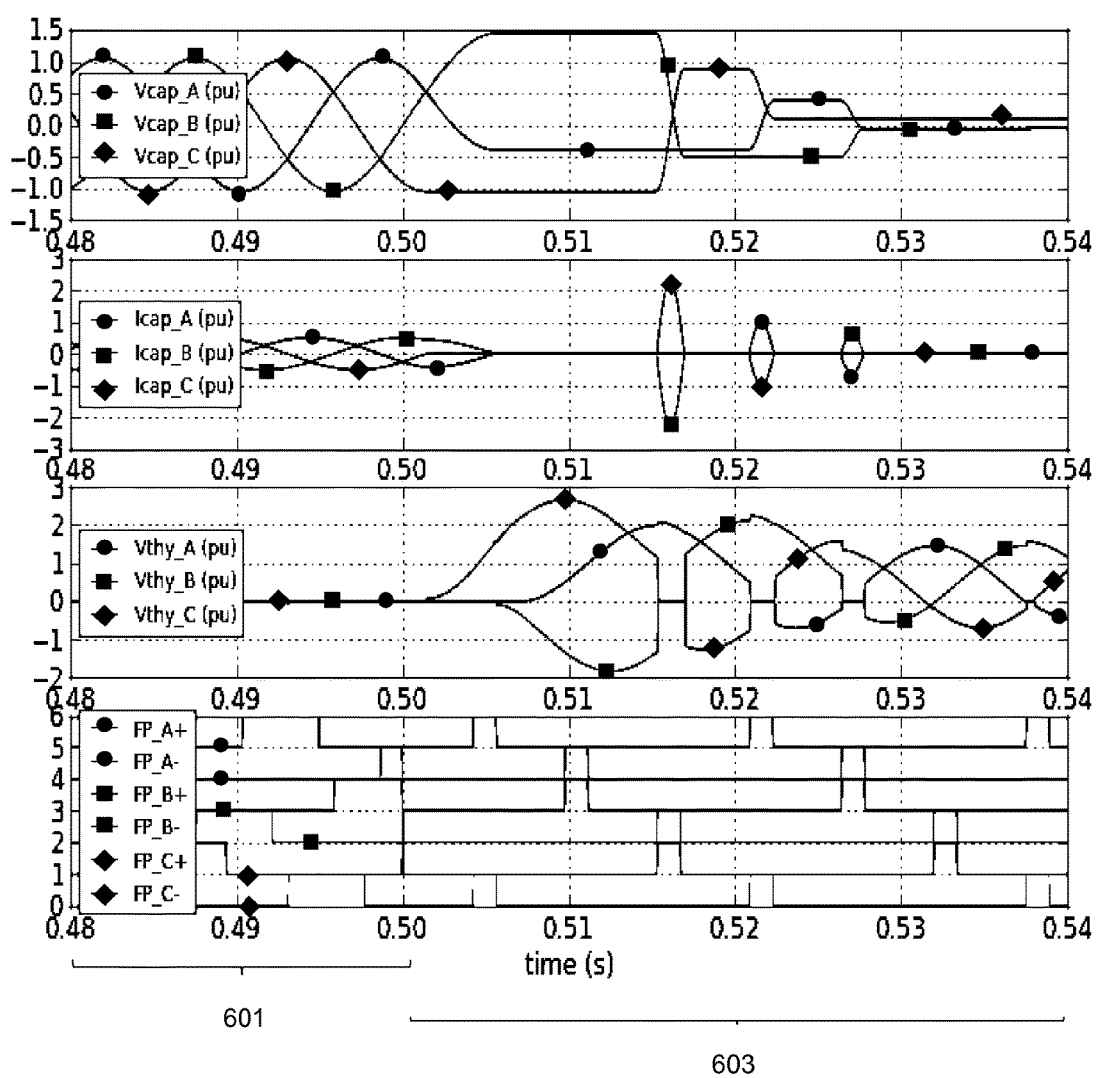
FIG. 6 is a timing diagram characteristic of discharging a Wye-type TSC, according to an embodiment.

FIG. 6 is an illustration of a timing diagram 600 consistent with the exemplary embodiment of discharging a Wye-type TSC utilizing firing pulses on the thyristor pairs. Timing diagram 600 includes plots indicating the voltages across the capacitors, the currents through the capacitors, the thyristor terminal voltages. Additionally, timing diagram 600 includes a panel (bottom) showing the operations described above.

For example, before a turn-off command is received at t=0.5 s, the thyristors are all in conduction mode, using the firing pattern shown in segment 601. After the command is received, i.e. from the start of segment 603, the firing pattern changes. This new firing pattern is designed to actively discharge the capacitors in order to protect the thyristors. However, unlike in the previous cases, the new firing pattern includes firing signals where thyristors from two different phases conduct at the same time. For instance, referring to the bottom panel of timing diagram 600, at around time t=0.51 s, thyristor TA− and TB+ are activated at the same time, using firing pulse FP_A− and FP_B+ respectively. As such, at least two thyristors associated with different phases of the transmission lines are fired simultaneously and for the same duration. Moreover, the two thyristors of associated with different phases that are fired as described above have current conduction directions that are opposite with respect to one another.

Furthermore, while the timing diagram 600 has been described in the context of turning off a Wye-type TSC, it can also be used to turn-off a Delta-type TSC, without departing from the disclosure of the invention. Nevertheless, the disclosed methods of actively discharging the capacitors according to timing diagram 500 are best suited for Wye-type TSCs. In summary, the method of discharging a Wye-type TSC according to timing diagram 600, Table 2, and Table 3, will be referred to hereinafter as "Wye-Type Discharging Method." The firing angles in this method can also be corrected with a predetermined delay, in which case the method is said to be a corrected method.

In one embodiment, the method disclosed in the context of FIG. 5 can be adapted to create a thyristor-saving Wye-type TSC topology. Specifically, with the neutral node floating, a Wye-type TSC can be constructed as shown in FIG. 6. The thyristors and the surge inductor in one of the three phases can be saved. FIG. 6 shows one embodiment where thyristor pair 103 and surge inductor $L_B$ are removed.

In this embodiment, a conditional check for actively discharging the capacitors can be achieved by checking whether the thyristors are in a conduction or a discharging mode. The required values for this conditional check are shown in Table 4. The method is thus referred to as as the "Wye-Type w/thyristor-saving architecture Discharging Method," and it can also be corrected.

Having set forth the operation of various embodiments, exemplary hardware implementations capable of producing the disclosed operational parameters are now discussed. Further, flow charts for exemplary methods consistent with the hardware implementations and the foregoing operational parameters are also provided.

TABLE 4

| Firing Pulse | Angle (degrees) of Sinusoidal Voltage for Phase 102a | |
|---|---|---|
| | Conduction Mode | Discharging Mode |
| FP_A+ | 270 | 150 |
| FP_A− | 90 | 330 |
| — | — | — |
| — | — | — |
| FP_C+ | 150 | 90 |
| FP_C− | 330 | 270 |

Figure 7:
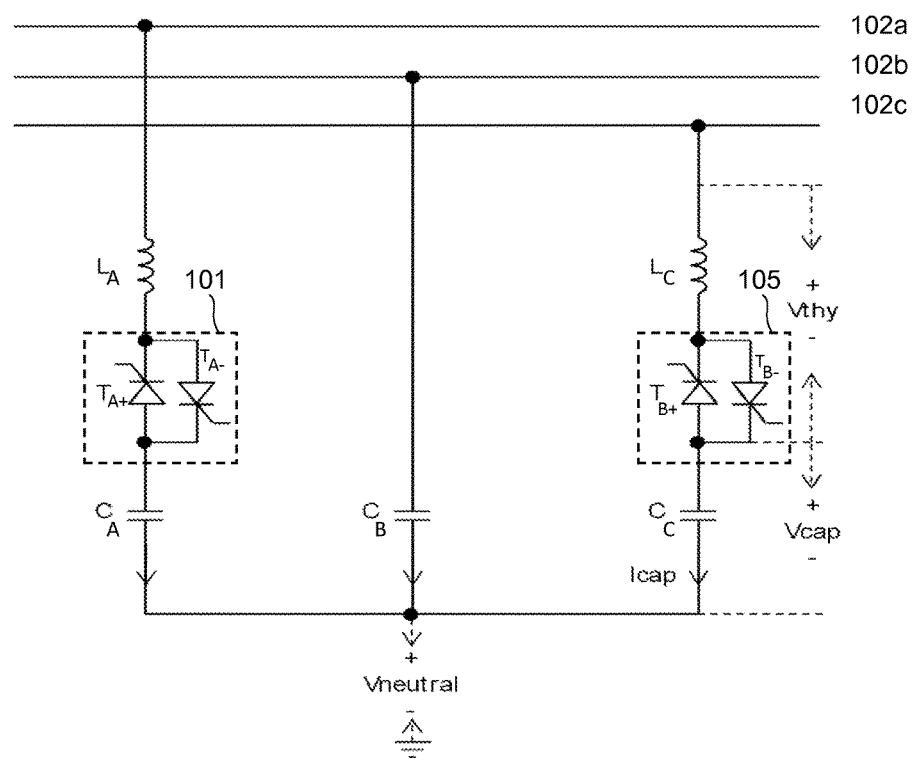
FIG. 7 is an illustration of a Wye-type TSC having a thyristor-saving architecture, according to an embodiment.
Figure 8:
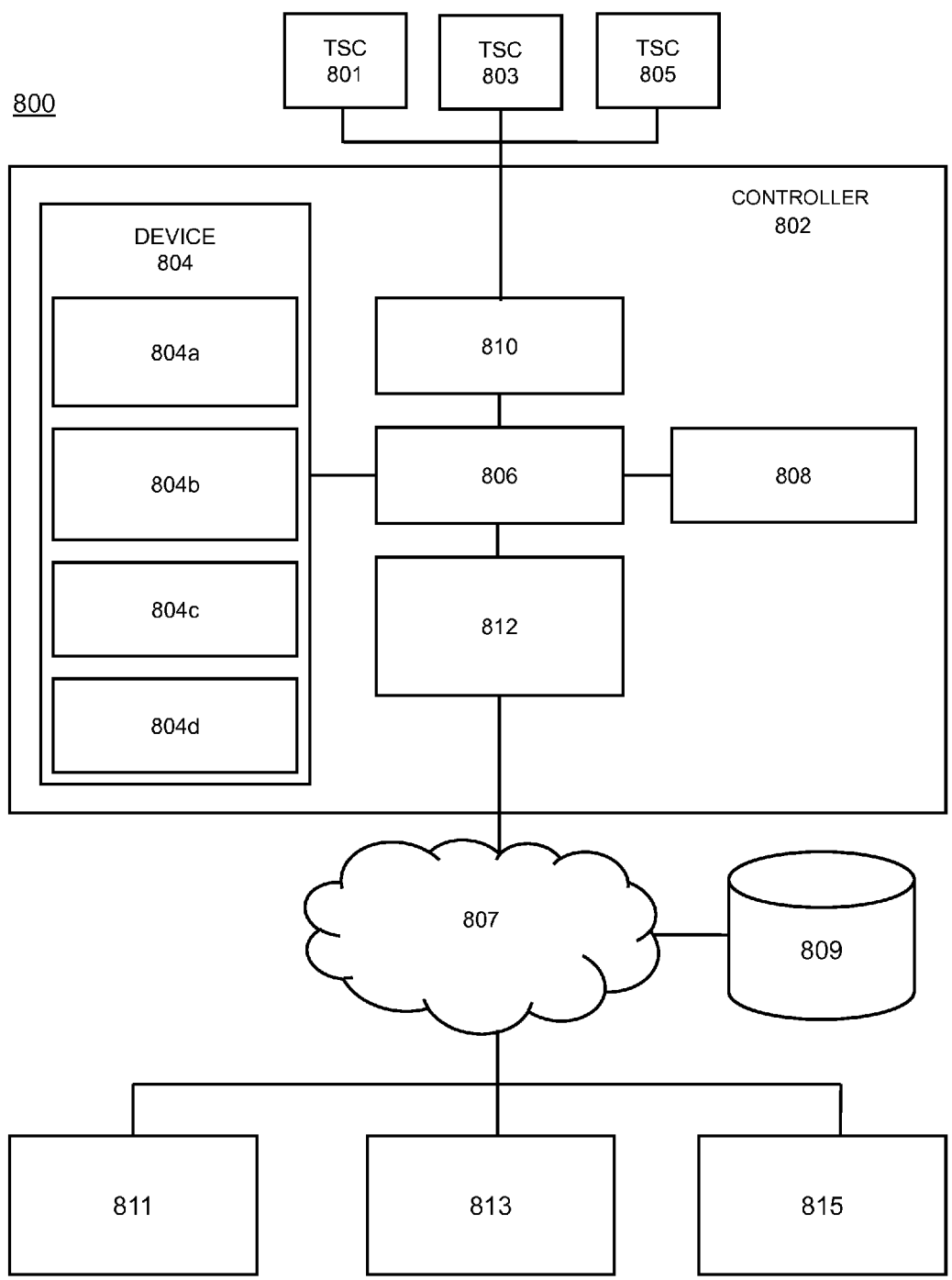
FIG. 8 is an illustration of a system, according to an embodiment.

FIG. 8 is an illustration of a system 800, according to an embodiment. System 800 can include a plurality of TSCs; only three are shown for simplicity, namely TSC 801, TSC 803, and TSC 805. Each TSC of the plurality of TSCs can include three TSC components wherein each component is associated with a specific phase of a three-phase transmission line, as shown in FIGS. 1 and 4. In some embodiments, one or more of the TSCs can be a Wye-type TSC with a thyristor-saving architecture 700 like the one shown in FIG. 7.

Furthermore, in an industrial application, TSCs 801, 803, and 805 may be capacitor banks located at different geographical locations of the same transmission line or power grid. Alternatively, each TSC may be associated with a specific transmission line.

System 800 may include one or more hardware and/or software components configured to fetch, decode, execute, store, analyze, distribute, evaluate, and/or categorize information relating to the various functions and applications discussed above. In some embodiments, the entirety of system 800 can be co-located with one of TSC 801, 803, and 805. In other embodiments, system 800 may be remotely located with respect to the plurality of TSCs and their associated transmission line(s).

System 800 can include a controller 802 that is configured to control TSC 801, TSC 803, and TSC 805. Control can include turning-off one or more of the TSCs according to one of the exemplary discharging methods described above. Controller 802 may control the TSCs in parallel, sequentially, or asynchronously. Further, controller 802 can be configured to issue a turn-off (or turn-on) command to one or more of the plurality of TSCs connected to it. Furthermore, while FIG. 8 shows a single controller 802 controlling the plurality of TSCs, in some embodiments, each TSC may have a dedicated controller like controller 802. Moreover, controller 802 may be configured to function as a client device communicatively coupled to a server (not shown) via network 807. The server may be located at a data center (not shown) or at one of the control stations 811, 813, or 815. Alternatively, the server may be distributed over a plurality of control stations.

Controller 802 may also be communicatively coupled to a database 809 via a network 807 using a communication network interface 812, which may also provide connectivity to one or more of a plurality of control stations (e.g. control stations 811, 813, and 815). In some embodiments, controller 802 may fetch instructions from database 809 and/or use database 809 as a storage medium to log operational parameters, measurements, configuration, and/or any other data pertinent to the functions of controller 802. Further, while the components of controller 802 are shown to be part of a single device, in some embodiments, these components may be distributed over a network, without compromising or altering the functions of the controller that are described herein.

Communication network interface 812 may include one or more components configured to transmit and receive data via communication network 807, such as one or more modulators, demodulators, multiplexers, de-multiplexers, network communication devices, wireless devices, antennas, modems, and any other type of device configured to enable data communication via any suitable communication network. Furthermore, ccommunication network 807 may be any appropriate network allowing communication between or among one or more computing systems, such as, for example, the Internet, a local area network, a power-line communication network, a telephone network, a wireless network, or a wide area network.

Further, in one embodiment, a user at a control station may directly monitor various operational parameters associated with controller 802 and the plurality of TSCs. The user may also issue commands (such as a turn-off command) and/or upgrade firmware/software modules of controller 802.

Controller 802 can include one or more processors 806, a storage device 808, a programmable device 804, and an input/output (I/O) module 810. In some embodiments, I/O module 810 may include a keyboard for input as well as fan-out terminals that may provide one or more paths for connection to peripheral devices. I/O module 810 can include current and voltage sensors configured to measure current and voltages from any one TSC coupled to controller 802. Processor(s) 806 can be configured to perform calculations from these measurements, such as power factor, angle, and any other pertinent metrics that can be obtained from current and voltage measurements. Furthermore I/O module 810 can include digital signal generation hardware configured to generate the firing pulses for controlling the thyristor pairs of the TSCs connected to controller 802. Furthermore, in some embodiments, in addition to the aforementioned components, I/O module 810 can include a touchscreen interface or the like for input and one or more displays for visual output, such as for example a view screen.

Processor(s) 806 may include one or more processing devices or cores (not shown). In some embodiments, processors 806 may be a plurality of processors, each having either one or more cores. The one or more processors 806 can be configured for execution of instructions fetched from programmable device 804 or fetched from storage device 808, or for execution of instructions obtained via network 807.

Storage device 808 may include a volatile or non-volatile, magnetic, semiconductor, tape, optical, removable, non-removable, read-only, random-access, or other type of storage device or computer-readable computer medium. Storage device 808 may include programs and/or other information that may be used by processor 806. Furthermore, storage 808 may be configured to log data processed, recorded, or collected during the operation of controller 802. The data may be time-stamped, GPS-tagged, cataloged, indexed, or organized in a variety of ways consistent with data storage practice without departing from the scope of the present disclosure.

The functionality of controller 802 is imparted by the structure provided by the software or firmware modules located in programmable device 804. For example, device 804 can include an initialization module 804a that when executed by processor 806 cause the processor to identify which types of TSCs are connected to controller 802. Identification information may be obtained from the TSCs themselves, in the form of a serial number, or any other type of identifier. Identification may also be obtained via network 807. As such, by executing module 804a with processor 806, a TSC can be identified as either being a Delta-type TSC, a Wye-type TSC, or a Wye-type TSC with a thyristor-saving architecture.

Device 804 can also include software or firmware modules dedicated for turning off a TSC according to its identified type. Specifically, device 804 can include a module 804b that is configured to instruct processor 806 to turn-off a Wye-type TSC according to the Wye-type TSC discharging method described above. Further, device 804 can include a module 804c that is configured to instruct processor 806 to turn-off a Wye-type TSC with thyristor-saving architecture according to the Wye-type TSC discharging method for thyristor-saving architectures described above. Furthermore, device 804 can include a module 804d that is configured to instruct processor 806 to turn off a Delta-type TSC according to the Delta-type TSC discharging method described above. For each discharging method, the required angle values may be pre-programmed into the controller 802 or obtained via network 807.

In either of the cases mentioned above, once a turn-off command for a specific TSC is received, processor 806 executes initialization module 804a to identify the thyristor configuration of the specified TSC. Processor 806 then executes the appropriate module (one of 804b-804d) to discharge the specified TSC. Discharging is achieved by first measuring voltages and currents to produce a measured angle. This is done by sensors located in I/O module 810. Subsequently, the required conditional checks are performed, according to the discharging method that is being used, i.e. according to which type of TSC was identified. Further, it is noted that processor 806 may update the required angles, or predetermined angle ranges, for each discharging method in view of a specified delay angle, which may be programmed into controller 802 (such as in storage 808) or obtained via network 807 in the form of a command.

Figure 9:
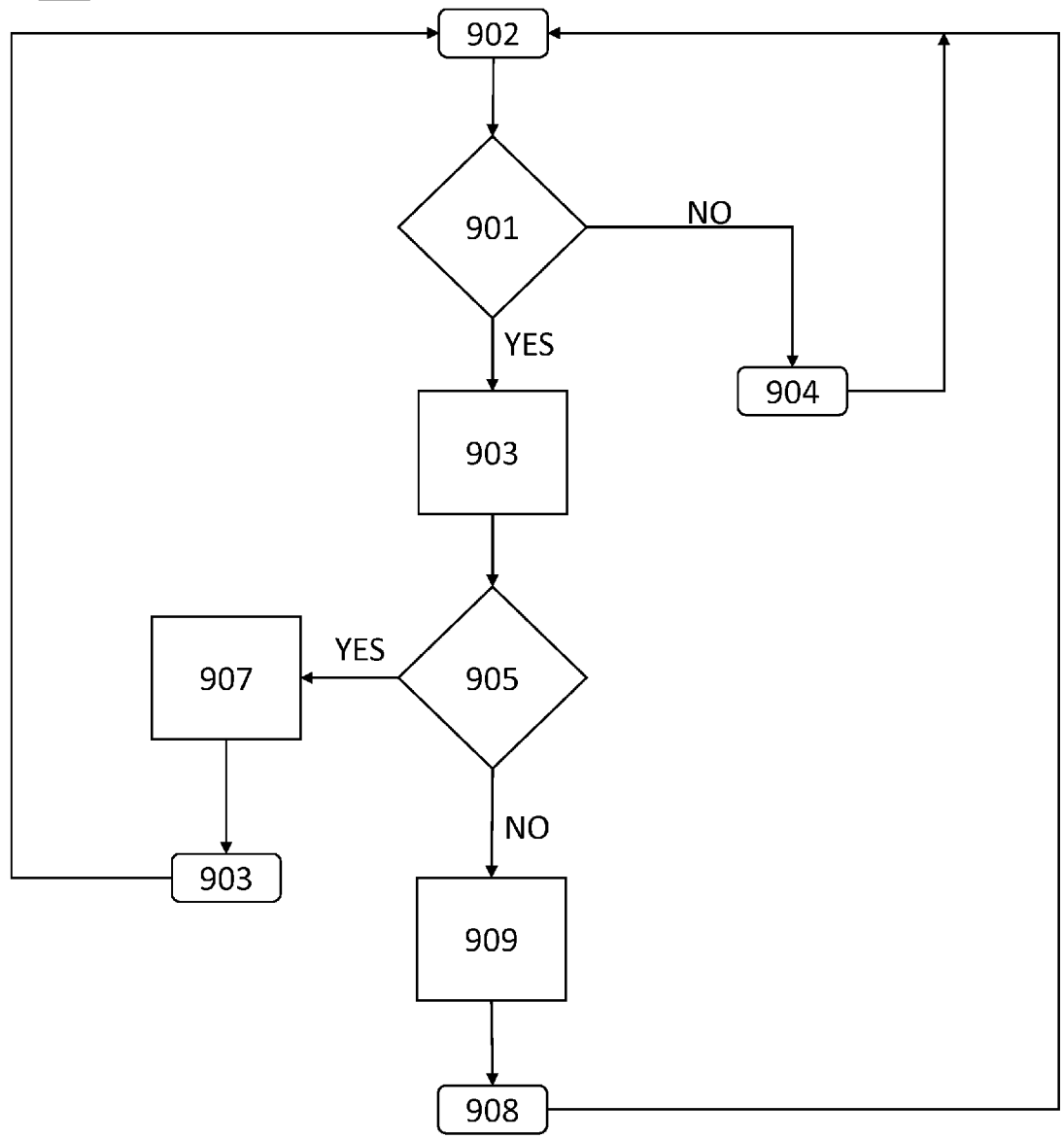
FIG. 9 depicts of a flow chart of a method, according to an embodiment.

FIG. 9 illustrates a method 900, according to an embodiment. The exemplary method can be executed by controller 802 and system 800 shown in FIG. 8. Method 900 includes determining whether a turn-off command has been received by the controller. (Step 901). In the case that answer is NO at step 901, method 900 ends at step 904. Otherwise, method 900 proceeds to step 903 where the controller determines which type of TSC is to be discharged. Based on the type identified, method 900 will proceed to discharge the TSC using the appropriate discharging method, as explained above (e.g. "Delta-type Discharging Method", "Wye-type Discharging Method," or "Wye-type with Thyristor-Saving Architecture Discharging Method"). However, prior to doing so, method 900 goes to step 905, wherein the controller checks whether a delay angle correction is needed for the pre-programmed angle values or ranges associated with the discharging method. If YES, method 900 moves to step 907 where the pre-programmed angle values or ranges are updated with the delay angle, and the appropriate corrected discharging method is performed. Method 900 then ends at step 906. Otherwise, method 900 proceeds to step 909 where the TSC is discharged according to the appropriate method with no correction to the pre-programmed angle values or ranges. Method 900 then ends at step 908.

Method 900, may run continuously or as needed. The continuous case is indicated by the lines joining END steps 904, 906, and 908 to starting step 902. Further, it is noted that method 900 can be a program executed by controller 802. This program can be loaded to controller 802 in the form of a tangible computer-readable medium such as storage device 808, or it may be loaded to processor 806 remotely via network 807.

Figure 10:
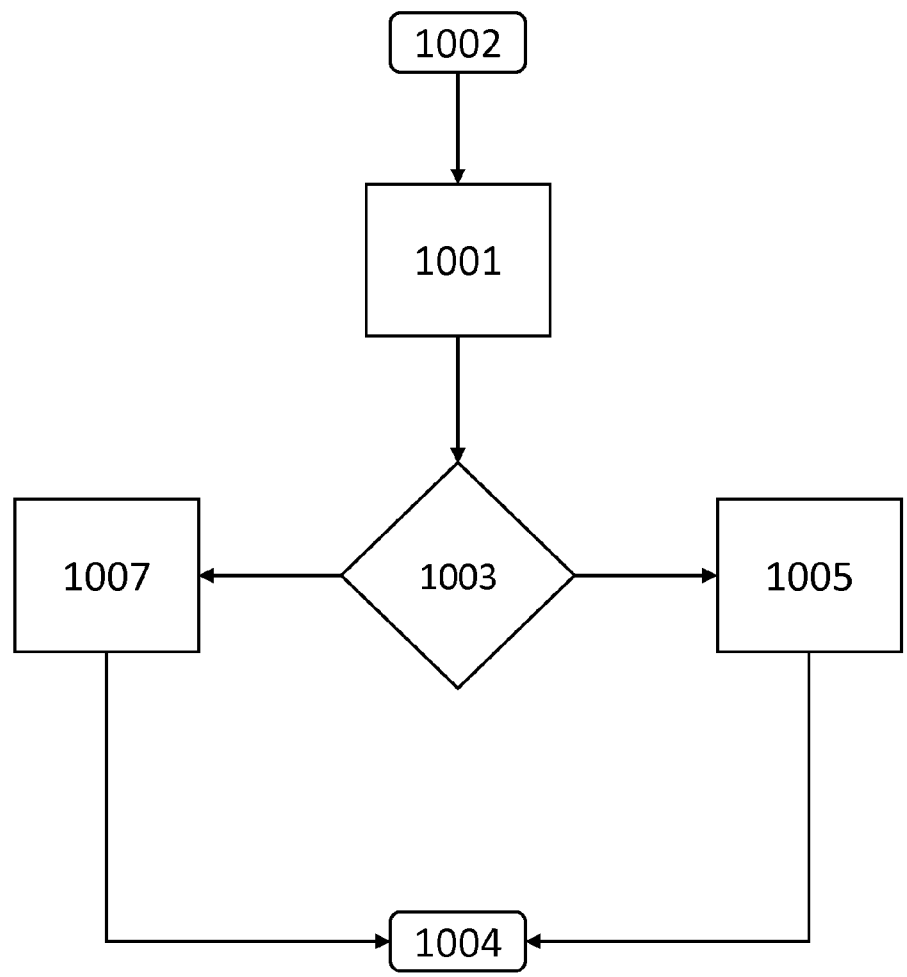
FIG. 10 depicts a flow chart of a method, according to another embodiment.

FIG. 10 illustrates a method 1000 according to an embodiment. Method 1000 is suited for discharging a Wye-type TSC. Method 1000 can also be executed by a controller 802 and system 800. Method 1000 begins at 1002 and then proceeds at step 1001 where the controller measures currents and voltages from the TSC to determine an angle value. The controller checks the angle values for each of the three phases of the TSC (step 1003) against a predetermined set of angle ranges. Based on the results of the checks, if the angle value for a phase is in one of a plurality of first predetermined angle ranges, method 1000 proceeds to discharge the TSC component of that phase according to a first discharging mode (such as mode 1 mentioned above). (Step 1005). Otherwise, if the angle value for the phase is one of a plurality of second predetermined angle ranges, method 1000 proceeds to discharge the TSC component of that phase according to a second discharging mode (such as mode 2 mentioned above) that is distinct from the first discharging mode. (Step 1007). Method 1000 ends at 1004, after either one of the discharging steps is performed.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A controller, comprising:
a processor communicatively coupled to (i) a pair of thyristors and to (ii) a capacitor, the capacitor and the pair of thyristors being coupled to a transmission line; and
a memory having instructions stored thereon, which when executed by the processor, cause the processor to perform operations comprising:
determining whether an angle of a voltage on the transmission line is within one of a first threshold range and a second threshold range;
discharging the capacitor when the voltage angle is within the first threshold range by operating the at least one thyristor in a first discharging mode; and
discharging the capacitor when the angle is within the second threshold range by operating the at least one thyristor in a second discharging mode distinct from the first discharging mode.

2. The controller of claim 1, wherein the angle is obtained by summing a measured value with a predetermined correction angle value.

3. The controller of claim 2, wherein during discharging in either the first discharging mode or the second discharging mode at least two thyristors coupled to different phases of the transmission line are activated simultaneously and for the same duration.

4. The controller of claim 1, wherein the operations further comprise determining whether a turn-off command has been issued prior to discharging the capacitor.

5. The controller of claim 1, wherein when the angle of the voltage is greater than about 30 degrees and smaller than about 90 degrees, or greater than about 150 degrees and less than about 210 degrees, or greater than about 270 degrees and less than about 330 degrees, the capacitor is discharged according to the first discharging mode.

6. The controller of claim 1, wherein when the angle of the voltage is greater than about 90 degrees and less than about 150 degrees, or greater than about 210 degrees and less than about 270 degrees, or greater than about 30 degrees or less than 330 degrees, the capacitor is discharged according to the second discharging mode.

7. The controller of claim 1, wherein the first discharging mode corresponds to a current through at least one thyristor being substantially zero after a positive half-cycle.

8. The controller of claim 1, wherein the second discharging mode corresponds to a current through at least one thyristor being substantially zero after a negative half-cycle.

9. A system, comprising:
a capacitor;
a pair of anti-parallel thyristors coupled to the capacitor at one end and to one phase of a transmission line at another end; and a processor, communicatively coupled to the pair of anti-parallel thyristors and the capacitor, the processor configured to:

determine whether an angle of a voltage on the transmission line is within one of a first threshold range and a second threshold range;

discharge the capacitor when the voltage angle is within the first threshold range by operating at least one of the pair of anti-parallel thyristors in a first discharging mode; and discharge the capacitor when the angle is within the second threshold range by operating at least one of the pair of anti-parallel thyristors in a second discharging mode distinct from the first discharging mode.

10. The system of claim 9, wherein the capacitor and the pair of thyristors are included in a Wye-type thyristor-switched capacitor circuit.

11. The controller of claim 1, wherein the capacitor and the pair of thyristors are configured according to a Wye-type configuration.

12. The controller of claim 1, wherein the transmission line is a three-phase transmission line.

13. The system of claim 9, wherein the angle is obtained by summing a measured value with a predetermined correction angle value.

14. The system of claim 13, wherein during discharging in either the first discharging mode or the second discharging mode at least two thyristors coupled to different phases of the transmission line are activated simultaneously and for the same duration.

15. The system of claim 9, wherein the processor is further configured to determine whether a turn-off command has been issued prior to discharging the capacitor.

16. The system of claim 9, wherein when the angle of the voltage is greater than about 30 degrees and smaller than about 90 degrees, or greater than about 150 degrees and less than about 210 degrees, or greater than about 270 degrees and less than about 330 degrees, the capacitor is discharged according to the first discharging mode.

17. The system of claim 9, wherein when the angle of the voltage is greater than about 90 degrees and less than about 150 degrees, or greater than about 210 degrees and less than about 270 degrees, or greater than about 30 degrees or less than 330 degrees, the capacitor is discharged according to the second discharging mode.

18. The system of claim 9, wherein the first discharging mode corresponds to a current through at least one of the pair of anti-parallel thyristors, the at least one pair of anti-parallel thyristor being substantially zero after a positive half-cycle.

19. The system of claim 9, wherein the second discharging mode corresponds to a current through at least one of the pair of anti-parallel thyristors, the at least one pair of anti-parallel thyristor being substantially zero after a negative half-cycle.

* * * * *